United States Patent
Holbrook et al.

(10) Patent No.: US 10,828,581 B2
(45) Date of Patent: Nov. 10, 2020

(54) WASTEWATER SEPARATION SYSTEM

(71) Applicant: FHNC Ltd. Co., Fort Worth, TX (US)

(72) Inventors: Kalan Flint Holbrook, Fort Worth, TX (US); Nicholas Ryan Cain, Fort Worth, TX (US)

(73) Assignee: FHNC LTD. CO., Fort Worth, TX (US)

( * ) Notice: Subject to any disclaimer, the term of this patent is extended or adjusted under 35 U.S.C. 154(b) by 566 days.

(21) Appl. No.: 14/995,191

(22) Filed: Jan. 13, 2016

(65) Prior Publication Data

US 2016/0243464 A1 Aug. 25, 2016

Related U.S. Application Data

(60) Provisional application No. 62/102,983, filed on Jan. 13, 2015.

(51) Int. Cl.
*B01D 17/02* (2006.01)
*B01D 21/26* (2006.01)
(Continued)

(52) U.S. Cl.
CPC ....... *B01D 17/0217* (2013.01); *B01D 21/267* (2013.01); *B04C 5/02* (2013.01);
(Continued)

(58) Field of Classification Search
CPC ............ B01D 17/0217; B01D 21/0012; B01D 21/267; B04C 5/02; B04C 5/04; B04C 5/081; C02F 1/40; C02F 1/38; C02F 1/001; C02F 2001/007; C02F 2101/32; C02F 2103/32; C02F 2301/046
See application file for complete search history.

(56) References Cited

U.S. PATENT DOCUMENTS

| 4,844,812 A | * | 7/1989 | Haynes | B01D 17/0214 |
| | | | | 210/741 |
| 5,858,237 A | * | 1/1999 | Hashmi | B01D 17/00 |
| | | | | 210/512.1 |

(Continued)

OTHER PUBLICATIONS

Rovinsky, Lev A., "Application of Separation Theory to Hydrocyclone Design", In Journal of Food Engineering, vol. 26, Elsevier Science Limited, 1995, pp. 131-146.

(Continued)

*Primary Examiner* — Claire A Norris
(74) *Attorney, Agent, or Firm* — Medley, Behrens & Lewis, LLC; Lorri W. Cooper

(57) ABSTRACT

A wastewater separation system for separating waste from water includes an inlet, a hydrocyclone, a decanter, and a recirculating means. The hydrocyclone receives a first amount of wastewater from the inlet and centrifugally processes the wastewater in order to remove at least some of the waste from the wastewater in order to expel treated water and a second amount of wastewater. The treated water exits the system. The decanter is coupled to the hydrocyclone for accepting the second amount of wastewater in order to separate the second amount of wastewater into a collection of waste and a third amount of wastewater. The recirculating means recirculates the third amount of wastewater back to the hydrocyclone for reprocessing.

15 Claims, 7 Drawing Sheets

(51) Int. Cl.
*C02F 1/38* (2006.01)
*C02F 1/40* (2006.01)
*B04C 5/02* (2006.01)
*B04C 5/04* (2006.01)
*B04C 5/081* (2006.01)
*C02F 1/00* (2006.01)
*C02F 101/32* (2006.01)
*C02F 103/32* (2006.01)

(52) U.S. Cl.
CPC ............ *B04C 5/04* (2013.01); *B04C 5/081* (2013.01); *C02F 1/38* (2013.01); *C02F 1/40* (2013.01); *C02F 1/001* (2013.01); *C02F 2001/007* (2013.01); *C02F 2101/32* (2013.01); *C02F 2103/32* (2013.01); *C02F 2301/046* (2013.01)

(56) References Cited

U.S. PATENT DOCUMENTS

| 2010/0029965 A1 | 2/2010 | Thornhill et al. |
| 2013/0048556 A1* | 2/2013 | Lister ................ B04C 5/081 210/512.1 |

OTHER PUBLICATIONS

Thew, M. T., "Cyclones for Oil/Water Separations", In II/FLOTATION/Cyclones for Oil/Water Separations, Academic Press, 2000, pp. 1480-1490.

Chen, et al., "Evaluation of Hydrocyclone Models for Practical Applications", In Chemical Engineering Journal, vol. 80, Elsevier Science B.V., 2000, pp. 295-303.

"Hyrdocyclone for Oil-From-Water Separation", In Filtration & Separation, Apr. 1996, pp. 291-292.

Rovinsky, Lev A., "Hydrocyclones for Processing Food Liquids", In Journal of Food Engineering, vol. 14, Elsevier Science Publishers, Ltd., 1991, pp. 129-138.

Gomez, et al., "Oil/Water Separation in Liquid/Liquid Hydrocyclones (LLHC): Part 1—Experimental Investigation", In SPE Journal, Society of Petroleum Engineers, Dec. 2002, pp. 353-372.

Young, et al., "Oil-Water Separation Using Hyrdocyclones: An Experimental Search for Optimum Dimensions", In Journal of Petroleum Science and Engineering, vol. 11, Elsevier Science B.V., 1994, pp. 37-50.

Wang, Lingjuan, "Theoretical Study of Cyclone Design", A Dissertation, May 2004, 151 pages.

Changirwa, Robert M.M., "Phenomenological Separation in a Three-Phase Hydrocyclone", A Thesis, 1997, 24 pages.

Dvorak, Robert Gerard, "Separation of Light Dispersions in Long Hydrocyclones", A Thesis, 1989, 24 pages.

Coelho, et al., "A Model for Performance Prediction of Hydrocyclones", In Chemical Engineering Journal, vol. 84, Elsevier Science B.V., 2001, pp. 7-14.

Castilho, et al., "A Simple Procedure for Design and Performance Prediction of Bradley and Rietema Hydrocyclones", In Minerals Engineering, vol. 13, No. 2, Elsevier Science Ltd., 2000, pp. 183-191.

* cited by examiner

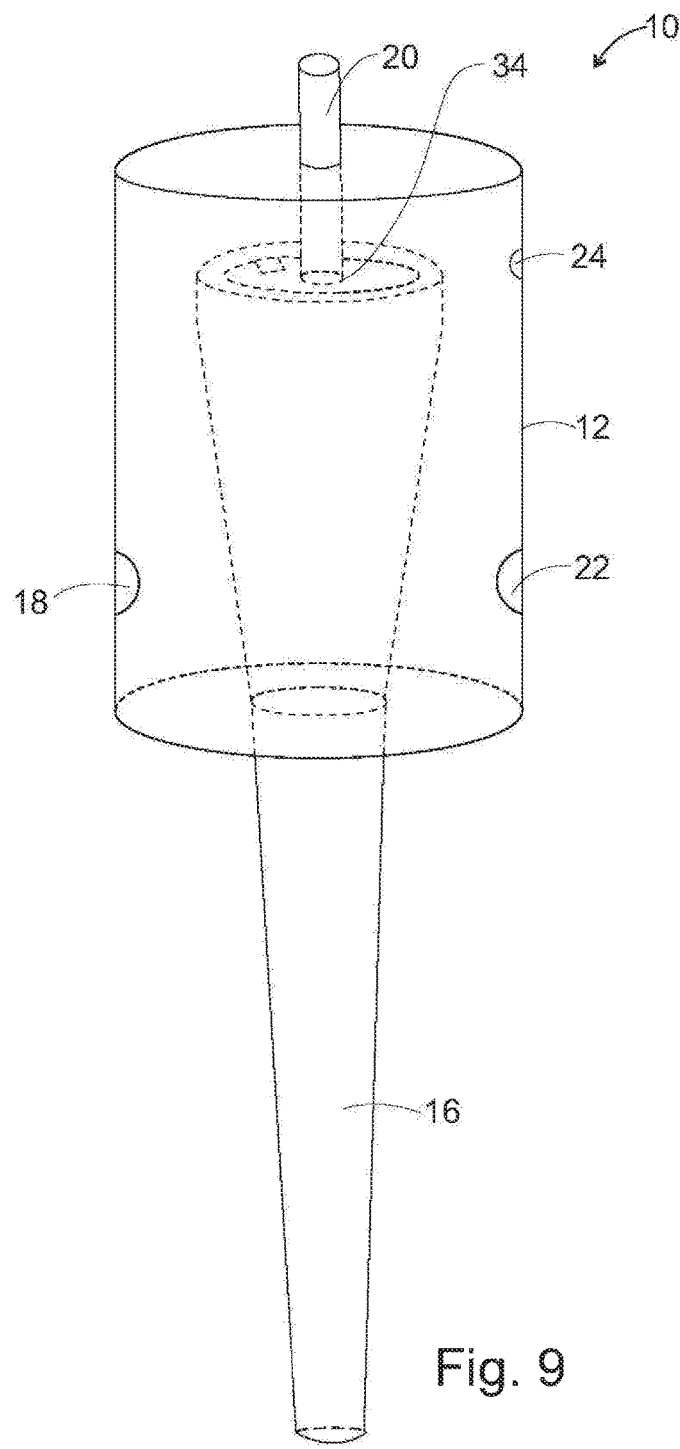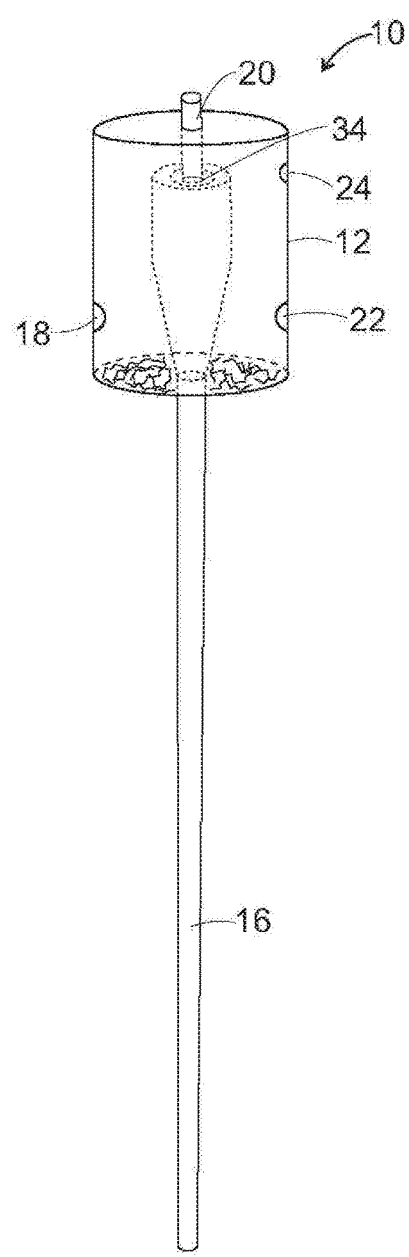
Fig. 9
Fig. 10

WASTEWATER SEPARATION SYSTEM

FIELD

The technology described herein relates to a water treatment system, and more particularly to a system for separating fats, oils, and grease from wastewater.

BACKGROUND

Many industries generate wastewater that predominantly includes fats, oils, and grease. Food and manufacturing industries are examples, with wastewater coming from such operations as dishwashing in a kitchen. The fats, oils, and grease within the wastewater can clog sewers. For example, approximately 30% of all clogs in the sewer are from fats, oils, and grease. The existing processes are not sufficiently effective at processing the wastewater and removing the fats, oils, and grease.

Hydrocyclones have been used to separate oil from water in industries such as the oil industry. In particular, they have been used on oil rigs where water can mix with the oil. These hydrocyclones are typically large and multiple hydrocyclones are used in series in order to separate water from oil.

DESCRIPTION OF THE DRAWINGS

FIG. 9 depicts an image of an example hydrocyclone;

FIG. 10 depicts an image of another example hydrocyclone;

DETAILED DESCRIPTION

The wastewater separation system according to the invention utilizes an example hydrocyclone and an example method as described herein. The removal of oils, grease, and fats from wastewater is a process that many companies encounter every day. In processes such as dishwashing in kitchens, larger waste particles are captured by grates or filters that are positioned in sinks. Grease traps are used to capture oils, greases and fats, and grease traps must be regularly cleaned out in order to effectively remove waste from water. Most businesses do not clean grease traps often enough. In addition, grease traps are not always effective in capturing all the waste. As a result, waste enters the waste water system and causes issues, such as clogging. The example wastewater separation system described herein provides a means for improving the treatment of wastewater so that less waste enters the wastewater or sewer system.

Figure 1:
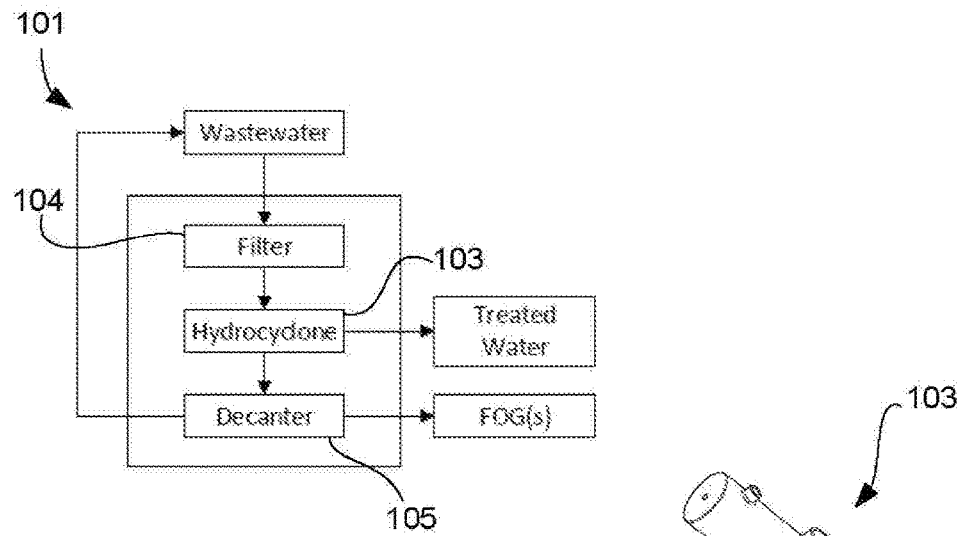
FIG. 1 is a flow diagram depicting an example wastewater separation system according to the invention.
Figure 2:
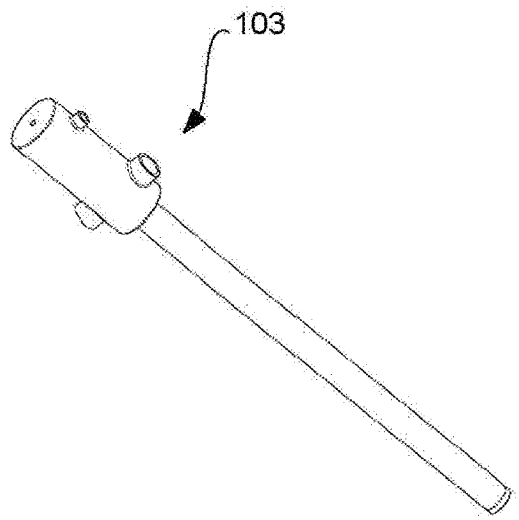
FIG. 2 is a perspective view of a hydrocyclone that is utilized with the wastewater separation system of according to the invention.
Figure 7:
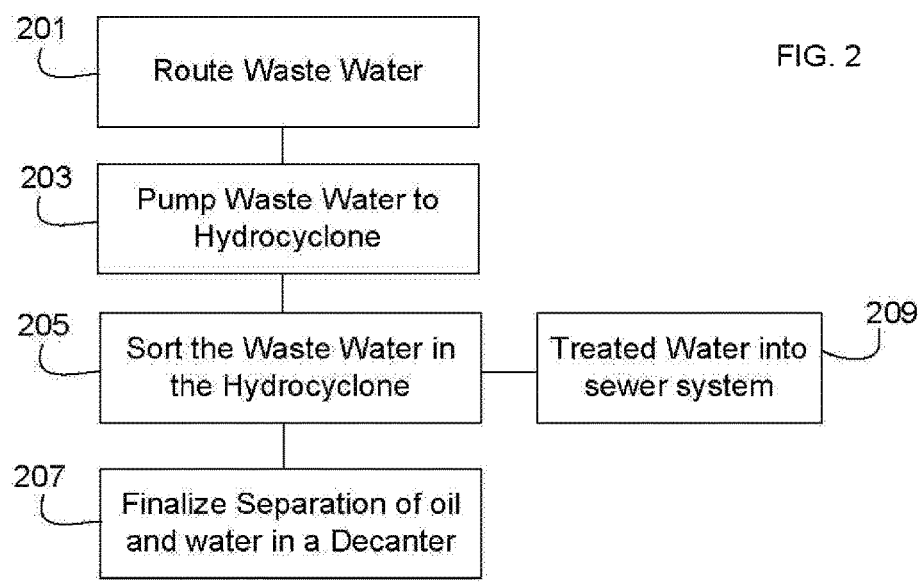
FIG. 7 is a flow diagram detailing the steps of processing wastewater within the separation system of FIG. 1.
Figure 3:
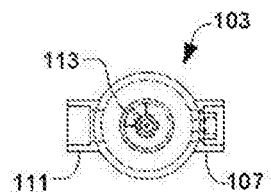
FIG. 3 is a top view of the hydrocyclone of FIG. 2.
Figure 4:
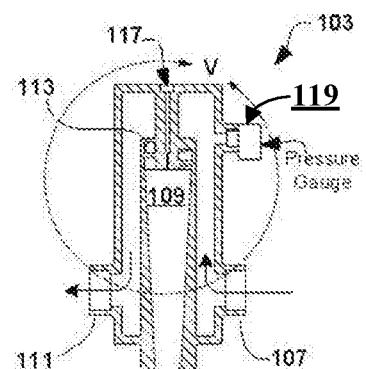
FIG. 4 is a cross-sectional side view of the hydrocyclone of FIG. 2.
Figure 6:
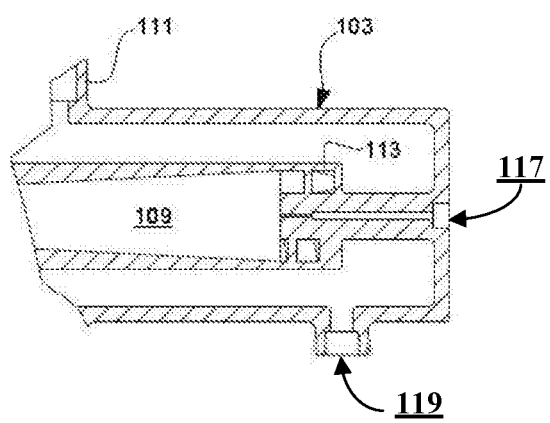
FIG. 6 is an enlarged detail view of a portion "v" of the hydrocyclone of FIG. 4.
Figure 8:
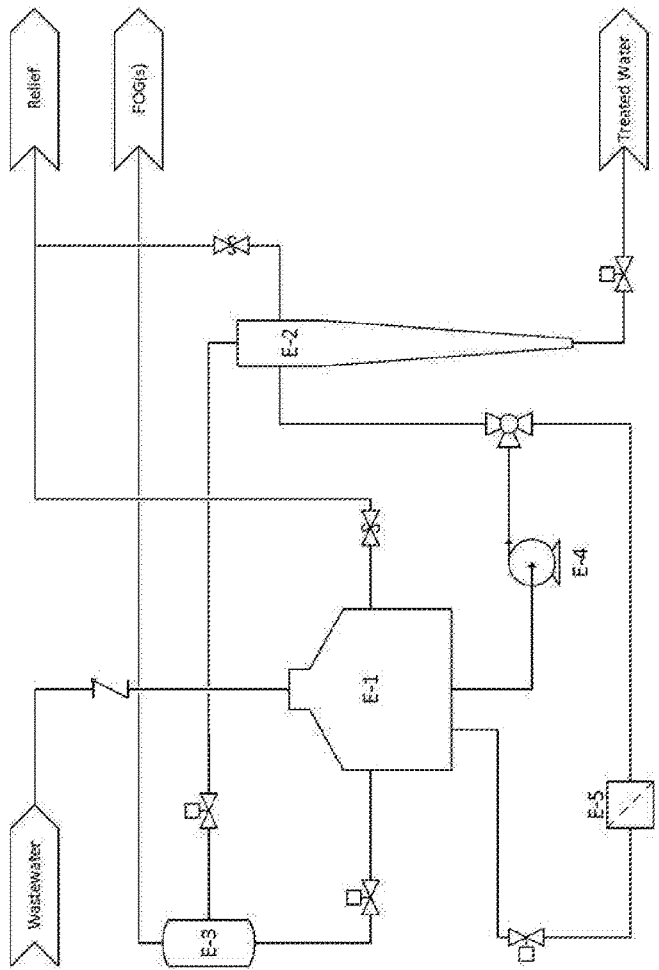
FIG. 8 is another flow diagram detailing the steps of processing wastewater within the separation system of FIG. 1.
Figure 5:
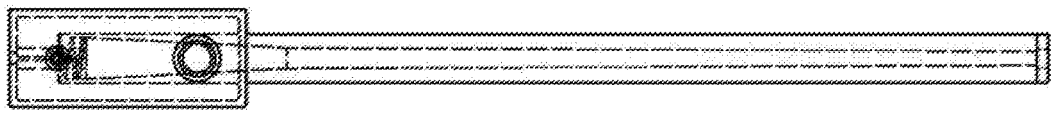
FIG. 5 is a cross-sectional front view of the hydrocyclone of FIG. 2.

The example system, as described in connection with the flow diagrams of FIGS. 1, 7 and 8, is configured to remove undesired fats, oils, and grease from wastewater by passing the wastewater through a hydrocyclone and a decanter. An example hydrocyclone is shown in FIGS. 2-6 and 9-15. The example system permits for the 2 stage separation of relevant portions of the wastewater. Hydrocyclones can be used to separate waste from water with a high level of efficiency, such as approximately 90%, 95% or 90-95%. The hydrocyclone includes a portion that is configured to efficiently and effectively separate the fats, oils, and grease from the wastewater. These and other unique features of the system are discussed below and illustrated in the accompanying drawings.

The system of the present application includes a hydrocyclone that is configured to receive wastewater through an inlet on the hydrocyclone. As wastewater passes through the hydrocyclone, it is subjected to centrifugal forces which act to separate fluids and substances of varied density. A decanter is configured to receive wastewater from the hydrocyclone and assists in further separating the fats, oils, and greases from the water utilizing gravitational forces. Once separated, the fats, oils, and greases may be hauled away and the water may be sent to the sewer or waste water treatment system for further treatment. By pre-processing the wastewater to eliminate the fats, oils, and greases, the sewer will be subjected to less clogging. In one example, the wastewater separation system may also include a filter that is positioned before the hydrocyclone. The filter is used for pre-filtration to filter particles and other substances from the waste water.

Referring now to the figures, FIG. 1 is a flow chart showing the overall operation of the example waste water separation system 101. As discussed above, system 101 includes a hydrocyclone 103, a filter 104, and a decanter 105 for the processing of selected wastewater prior to entrance through the municipal sewer system for further treatment. System 101 is configured to separate fats, oils, and greases, collectively referred to as "FOGs," from the wastewater to reduce their presence within the municipal sewer system. This should eventually result in fewer clogs within the sewer system. Resultant oils may be separated away and processed via conventional methods (i.e. recycling or disposal). The hydrocyclone 103 will be described in greater detail in FIGS. 2-6 and 9-15. The system 101 accepts wastewater from a facility. The wastewater travels first through a filter 104. The filter 104 is configured to remove small food particles that may disrupt separation within the hydrocyclone 103. Wastewater exits the filter 104 and enters the hydrocyclone 103. Some of the water exits the hydrocyclone 103 as treated water. The treated water enters the sewer system. The remainder of the wastewater enters the decanter 105. The decanter 105 separates waste from the water and FOGs are removed from the decanter 105 while the remaining wastewater returns to the beginning of the system to be reprocessed. Filter 104 is shown as being included in the system 101, but is optional. In cases where pre-filtration is not needed, it is not needed in order for the system to operate properly.

FIGS. 2-6 and 9-15 illustrate various views of the hydrocyclone 103. The hydrocyclone 103 has an elongated tubular body configured to receive pressurized fluid through an inlet and subject that fluid to centrifugal forces in an effort to separate the various liquids elements that have different densities. Fluid in the form of wastewater that contains FOGs enters the hydrocyclone 103 via inlet 107 and is routed up and around conical portion 109. Fluid leaves hydrocyclone 103 via outlet 111 which is a relief valve. The fluid that enters the hydrocyclone 103 is pressurized utilizing a pump or other device. The outlet 111, along with separate valves and other devices permits for the pressure of the fluid within the hydrocyclone 103 to be regulated e.g., outlet 111 is a relief valve for regulating pressure). (See also FIG. 11, ref. no. 22). Fluid in the hydrocyclone passes over the conical portion 109 and is fed tangentially into an inner tube 113 as a result of the internal pressure of the fluid. As the pressurized fluid enters inner tube 113, it gains momentum and enters conical portion 109 where the length and angle of the conical portion 109 is selectively chosen to adequately separate water from FOGs waste. Treated water then passes downward through port 115 and proceeds onto the municipal sewer system. Other wastewater that includes FOGs escapes through port 117 and directed to the decanter 105. An opening for the use of an optional pressure gauge is also provided. The hydrocyclone 103 also includes a relief port 119 that permits fluid to exit the hydrocyclone in the event that pressure exceeds an allowable limit.

The decanter 105 is a vessel that is used to hold a fluid and allow gravitational forces to separate the elements within the fluid. Typically this could be seen in a vessel in which a wide body for the fluid is combined with a narrower neck portion. However the exact shape and size of the decanter 105 is able to vary depending on the specific circumstances and use. The wastewater that leaves port 117 is fairly cleared of FOGs and may have a ratio, for example, of as little as 10% FOGs and 90% water. The decanter 105 acts as mechanism for secondary processing of the wastewater fluid after wastewater has exited the hydrocyclone 103. The decanter 105 takes waste from a top end of the hydrocyclone and assists in separating any remaining water from the FOGs waste. Water from decanter 105 is recycled back into a wastewater tank and may be re-processed by one or more hydrocyclones 103 within the system 101. Over time, the various FOGs within the water are separated and removed, allowing the wastewater to be sent for processing in the municipal sewer systems. Any oil or FOGs removed may be treated and recycled, destroyed, or disposed of according to standard processes.

It should be noted that the decanter is optional. It may be needed in some systems and not in others.

Referring now to FIG. 7, a flow diagram illustrates the steps used to treat the wastewater according to the system 101. In the first step 201, wastewater is routed to the system. In the next step 203, wastewater is pumped to the hydrocyclone 103. In the next step 205, wastewater is sorted utilizing the hydrocyclone 103. Some of the treated water exits the hydrocyclone 103 into the sewer system in step 209. The remaining wastewater enters a decanter to finalize separation of FOGs and water in step 207.

The decanter 105 allows water to separate from the waste using gravity. The water settles because it is heavier than the FOGs. The FOGs float on the water. The decanter 105 is similar to existing grease traps in that it helps to separate the FOGs from any water. After the FOGs have separated from the wastewater, the waste water is circulated back to the hydrocyclone 103 for reprocessing while the FOGs are stored in a grease trap.

FIG. 8 depicts a more detailed flow diagram of the wastewater separation system. Wastewater enters the system through a valve under normal pressure and wastewater is permitted to collect in a collection tank E-1. Once the tank hits a level of fullness, the wastewater is pumped utilizing a pump E-4 through a filter E-5 in order to separate particulates from the water, since particulates may clog the hydrocyclone. The filter also helps to unify the liquid so that the greases and oils are suspended in the liquid. The fluid is then returned to the tank E-1. Fluids may be filtered more than once, if deemed necessary. Fluid is then pumped to the hydrocyclone E-2 utilizing the pump E-4.

In the hydrocyclone E-2, fluid is circulated circumferentially in order to drive FOGs and some water upwardly to exit the hydrocyclone E-2. Treated water exits through a lower end of the hydrocyclone E-2. Untreated water enters the hydrocyclone with about 1% waste. The treated water has most of the oil and greases removed from the water such that between approximately 0.1% and 0.05% of grease and oils is mixed in with the water, which is a separation efficiency of 90% and 95%, respectively.

This water is considered clean enough to enter the sewer system and is, thus, expelled to the sewer system. The wastewater that exited the top end of the hydrocyclone travels to the decanter E-3, where water is permitted to settle from the FOGs. Approximately 90% of the FOGs present in the wastewater exit through the top end of the hydrocyclone and enter the decanter E-3. The decanter includes separating media that helps to separate the FOGs from the water. The FOGs exit through the top of the decanter E-3 and are disposed of The bottom layer of water exits the decanter and is returned to the tank E-1 for reprocessing.

If pressure in the tank E-1 becomes too high and exceeds a predetermined limit, a relief valve is coupled to the tank that permits some of the contents of the tank to be released from the tank until an acceptable pressure is reached. The hydrocyclone valve also has a relief valve that permits fluid to exit the hydrocyclone E-2 in the event pressure in the hydrocyclone exceeds a predetermined limit.

In operation, wastewater containing FOGs is routed 201 to system 101 for treatment and processing. System 101 is located prior to entry of the wastewater into the municipal sewer system. The wastewater passes through a pump 203 where it is pressurized and directed into hydrocyclone 103. The pressure is regulated between inlet 107 and outlet 111 through the use of one or more devices and valves. The wastewater enters inner tube 103 and gains momentum for sorting 205 of the FOGs within conical portion 109. Separated water is permitted to leave 209 hydrocyclone from a first port while water still containing FOGs is exited via a second port where it is passed to a decanter to finalize 207 the separation of FOGs from the water.

Hydrocyclones are known, as discussed above in the background section. A hydrocyclone is a simple centrifuge that amplifies centrifugal force to cause fluids of different densities to separate from one another. The example hydrocyclone, as shown in FIGS. 9-15, has features designed to work more advantageously in removing waste FOGs from water.

Figure 11:
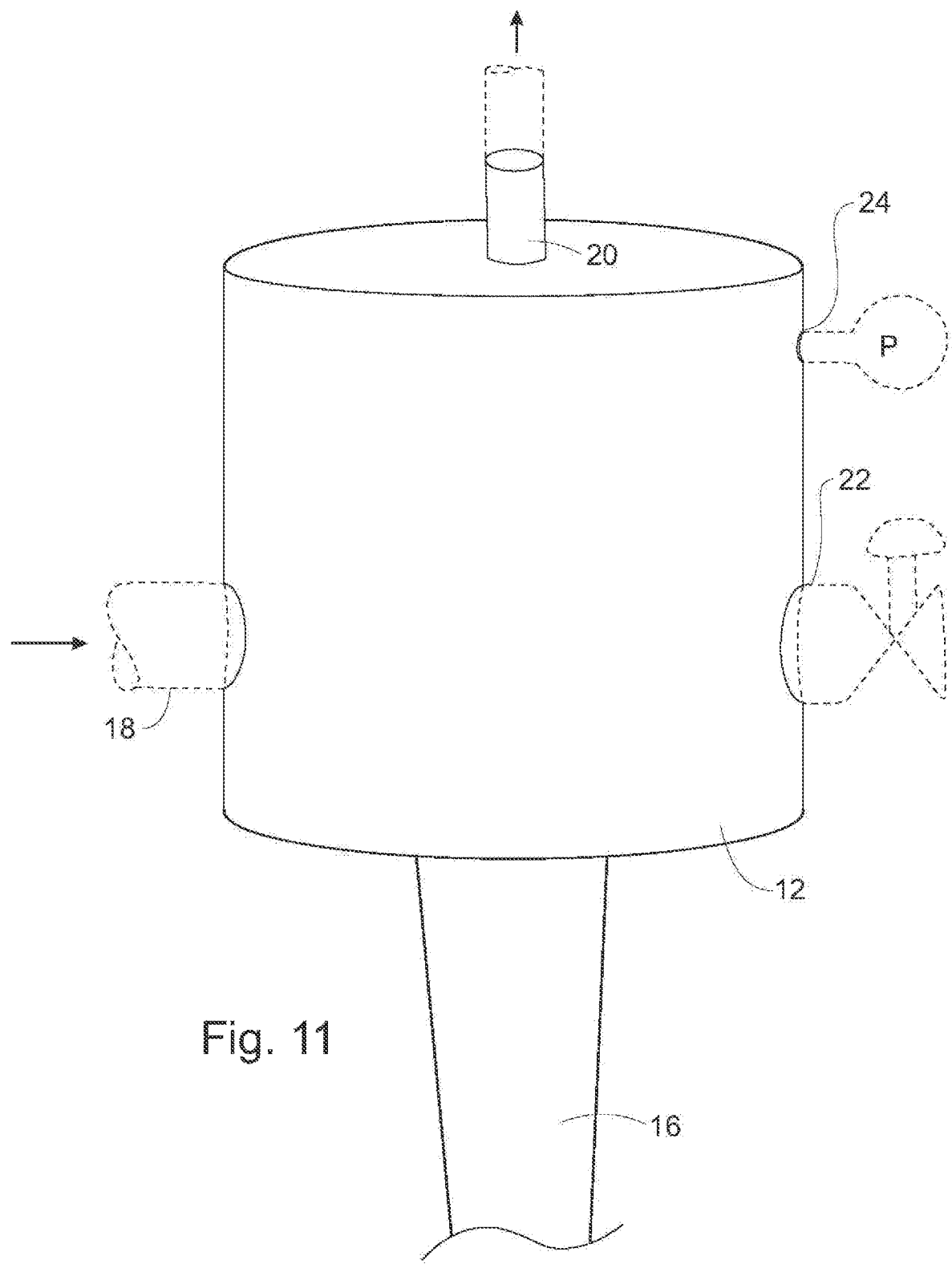
FIG. 11 depicts an image of an inflow chamber segment of an example hydrocyclone.
Figure 12:
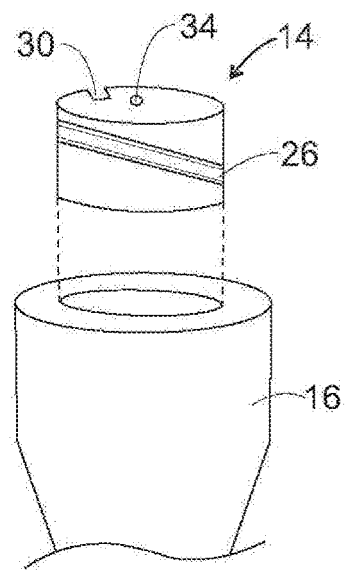
FIG. 12 depicts a perspective view of an inlet segment of the hydrocyclone.
Figure 13:
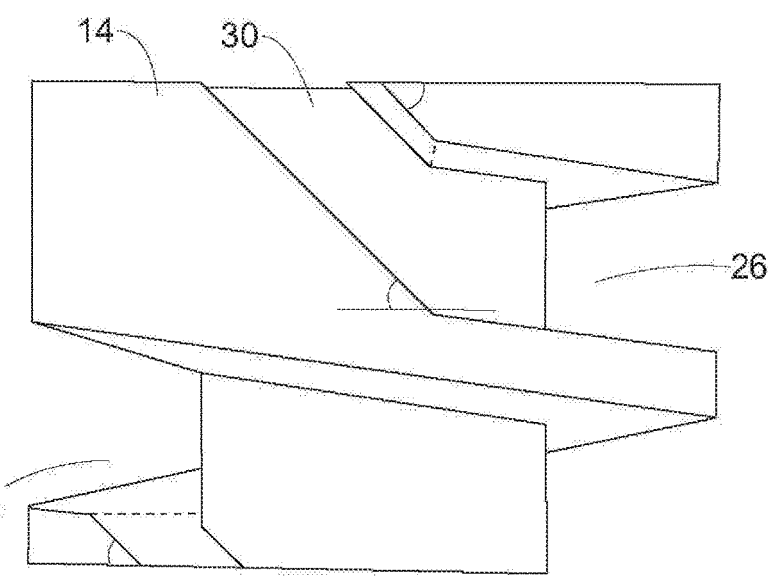
FIG. 13 depicts a side view of an inlet segment.

Example hydrocyclones 10 are shown in FIGS. 9-11 and comprise three separate parts or segments that are constructed using known fabrication techniques and materials. The hydrocyclone segments include an inflow chamber 12, an inlet 14, and a funnel 16.

The inflow chamber 12 is the segment where wastewater enters. It is designed to fit nominal piping, although other sizes and types of piping may also be utilized. The inflow chamber 12 is designed to gauge and regulate the inflow pressure of the wastewater for optimal hydrocyclone 10 separation. The inflow chamber 12 is shown best in FIGS. 9-11 and is a feed and overflow chamber that surrounds the inlet 14 and the upper and middle sections of the funnel 16. The inflow chamber 12 has an inlet flow connection 18 on a side thereof, an outlet flow connection 20 on a top surface thereof, a relief valve connection 22 on a side thereof, and a pressure gauge connection 24 on a side thereof. The inflow chamber 12 is tubular and pipe shaped, with a closed upper and lower end. The inlet 14 is surrounded by the inflow chamber 12.

The inlet 14 is positioned in the inflow chamber 12. In the example shown, it includes a spiral pathway 26 that generates a spiral flow down the length of the device 10. The inlet is shown in greater detail in FIGS. 12-14. The inlet 14 has an opening 30 in which wastewater flows from the inflow chamber 12. This opening 30 connects to the spiral pathway 26, which is a downward pitched spiral channel or passageway that is designed to move the wastewater flow into a sloping radial trajectory as it enters the funnel section 16 of the hydrocyclone. The inlet 14 segment has a small overflow orifice 34, from which the untreated-fraction of the hydrocyclone separation is removed from the top of the device 10.

The inlet 14 is a member that seats inside the top end of the funnel 16. The inlet 14 propels inlet fluid flow down the funnel 16. The inlet member 14 is interference fitted into the top of the funnel 16. It can also be welded in place. The inlet 14 guides the inflow into a swirling pattern with a groove channel 26. The inlet 14 controls the amount of wastewater that may exit from the top of the inlet 14 by varying the size of the outlet hole 34.

The funnel 16 is the segment in which wastewater is separated into two streams of treated water and untreated water via centrifugal force. The funnel 16 has a series of adjoined gradient channels. The first is a short channel that has a steeper pitch. The second is a long channel with a shallower pitch. The wastewater has a spiral flow trajectory that was generated from the spiral 26 pathway in the inlet 14. This spiral flow continues into the funnel 16 to produce fluid-fluid separation. The funnel 16 has an underflow orifice from which the treated water flows from the bottom of the hydrocyclone device. The funnel 16 is typically long and narrow. It has three sections that may be machined from a single piece of material, such as milled from carbon steel.

Figure 14:
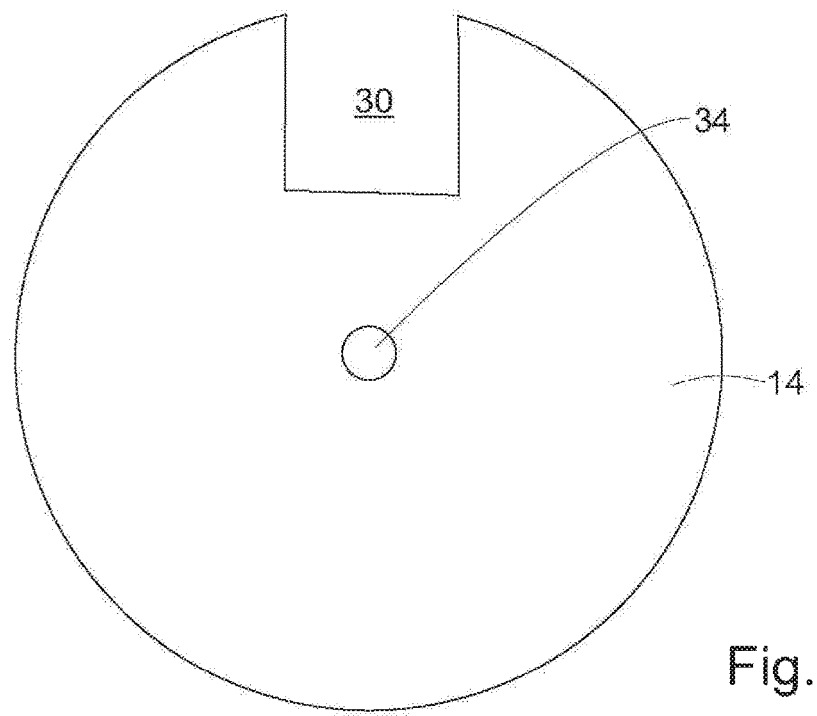
FIG. 14 depicts a top view of an inlet segment.
Figures 15, 16:
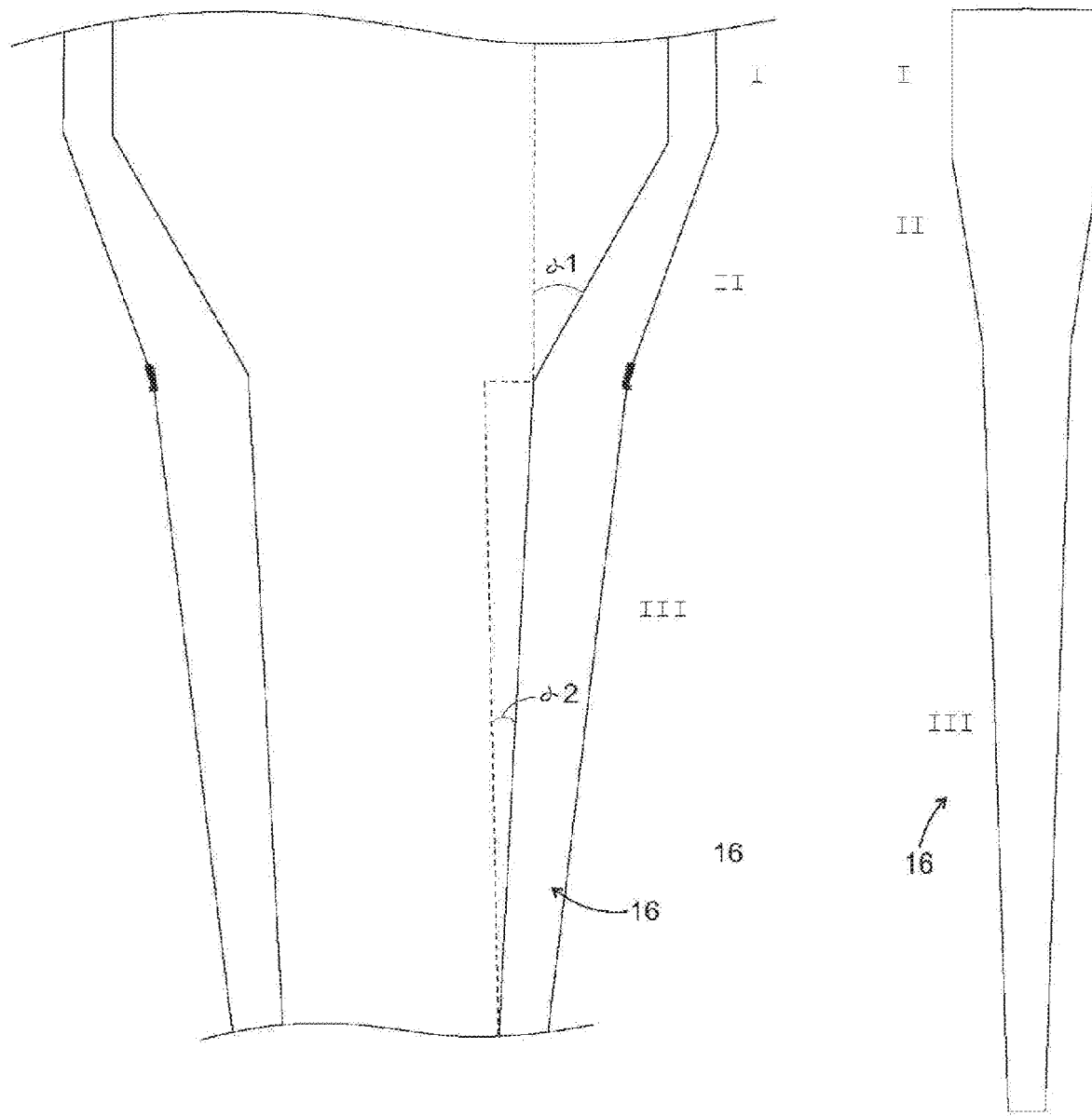
FIG. 15 depicts a cross-sectional view of one example of a funnel of the hydrocyclone.
FIG. 16 depicts a front view of another example funnel of the hydrocyclone.

The sections of the funnel 16 are shown best in FIGS. 14 and 15 and include an upper section I, a middle section II, and a lower section III. The upper section is a straight pipe, the middle section is a steep angled funnel, and the lower section is a shallow angled funnel.

The hydrocyclone is driven by centrifugal force and pressurized feed of the waste stream. Centrifugal forces are created within the hydrocyclone 10 by the effects of both radial fluid flow and the specific dimensions of the funnel segment 16, among other reasons. The centrifugal forces along with the dimensions of the hydrocyclone 10 are responsible for the separation efficiency of the device. The size of the hydrocyclone 10 can vary depending upon the particular application. In one example, the hydrocyclone 10 may be about 36 inches long. This size hydrocyclone 10 could handle most restaurant waste flows and could handle between 8 and 10 gpm of waste. If the application were a chicken factory, the size would be larger in order to accommodate a greater amount of waste.

While the example inlet 14 is shown having a spiral passageway, the configuration of the passageway could vary from this design. The overall design is a function of the waste stream at issue and the size of the hydrocyclone 10.

A hydrocyclone 10 that is about 36 inches long is typically utilized for lower wastewater flow, such as, for example, less than 10 gpm. The example hydrocyclone 10 is fully scalable depending upon the application. The hydrocyclone 10 can be designed taking into account specific geometries of the funnel 16, a specific design for the spiral or other passageway in the inlet 14, as well as the overall design of the inflow chamber 12, which is the tube that surrounds the top of the funnel 16.

In one example hydrocyclone 10, the top diameter Dc is about 1 inch and the top inflow diameter Di is about 0.25 inches. The length of the top section Lcyc1 is about 0.5 inches, the length of the first conical section Lc is about 4.75 inches, and the length of the second conical section Lb is about 18 inches. The pitch of the first conical section Alpha is about 3 degrees. The pitch of the second conical section Beta is about 0.25 degrees. The bottom outlet diameter Du is about 0.33 inches and the top outlet diameter Do is about 0.01 inches.

Examples of materials that may be utilized for the construction of the hydrocyclone 10 include metals, such as steel or stainless steel, polymer plastics, nylons, composite materials, such as carbon fiber, other materials, or a combination of any of these materials.

Although only one hydrocyclone 10 and one decanter have been described and illustrated, it is understood that other embodiments may utilize and include a plurality of hydrocyclones and/or decanters in series or parallel to achieve the desired purity of the treated water.

FIGS. 9-15 are meant for illustration purposes and are not exacting in terms of dimensions.

Although municipal water treatment systems are referred to in this application, it is understood that other treatment systems may be contemplated for use post treatment with system 101, including septic systems and the like. Additionally, system 101 may be used at any point within the treatment of wastewater in accordance with existing municipal or other water treatment systems.

The term "substantially," if used herein, is a term of estimation.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A wastewater separation system for separating waste from water comprising:

an inflow chamber having an inlet for receiving wastewater underpressure;

a relief outlet coupled to the inflow chamber for permitting wastewater to exit the inflow chamber when pressure in the inflow chamber exceeds a predetermined amount; and a hydrocyclone positioned inside the inflow chamber and in fluid communication with the inlet for centrifugally processing the wastewater wherein the hydrocyclone includes a lower portion having a conical internal shape and an upper portion that includes an upwardly facing surface having an opening disposed therein and an angled spiral inner tube that extends downwardly from the opening into the lower portion of the hydrocyclone, with the opening being configured to receive the wastewater from the inflow chamber and with the angled spiral tube providing the wastewater with angular momentum before the wastewater enters the lower portion, wherein, in the lower portion, wastewater is separated into a first amount that is expelled through a first exit and a second amount that is expelled through a second exit, with the first amount has having a lower concentration of waste than the second amount.

2. The system of claim 1, wherein the first exit comprises an orifice at a lower end of the lower portion and the second exit comprises an orifice defined in an upper end of the upper portion of the hydrocyclone.

3. The system of claim 1, wherein at least part of the second amount of wastewater that exits through the second exit is recirculated back to the hydrocyclone for reprocessing.

4. The system of claim 3, further comprising a decanter coupled to the hydrocyclone for receiving the second amount of wastewater, with the decanter assisting in separating the second amount of wastewater into a collection of waste and a third amount of wastewater, with the collection of waste being removed for disposal and the third amount of wastewater being recirculated utilizing a recirculating means to the hydrocyclone for reprocessing.

5. The system of claim 1, further comprising a pump for assisting in moving fluids through the system and a relief valve coupled to the inflow chamber for relieving any excess pressure that is generated in the inflow chamber hydrocyclone.

6. The hydrocyclone of claim 1, wherein the inflow chamber is cylindrical.

7. The hydrocyclone of claim 6, wherein the lower portion of the hydrocyclone has an upper section, a middle section, and a lower section, with the upper section being cylindrical, the middle section being funnel-shaped, and the lower section being funnel shaped.

8. The system of claim 1, wherein the tube inlet is positioned on an upwardly facing surface of the hydrocyclone.

9. The system of claim 1, wherein the upper portion includes a cylindrical body having an open upper end for receiving a plug-like member therein, with the plug-like member defining the spiral inner tube.

10. The system of claim 1, wherein the opening in the upwardly facing surface of the hydrocyclone is positioned adjacent the second exit.

11. The system of claim 1, wherein the opening in the upwardly facing surface of the hydrocyclone opens upwardly.

12. The system of claim 1, wherein the inflow chamber defines an open space therein and at least part of the open space within the inflow chamber is located above the upwardly facing surface of the hydrocyclone.

13. The system of claim 12, wherein a tube is coupled to the second exit of the hydrocyclone and the tube extends upwardly through the open space and out of the inflow chamber.

14. The system of claim 12, wherein the inflow chamber surrounds part but not all of the hydrocyclone.

15. The system of claim 1, wherein a tube is coupled to the second exit and extends upwardly through and out of the inflow chamber.

* * * * *